United States Patent [19]

Rudd

[11] 4,243,764
[45] Jan. 6, 1981

[54] BLENDS OF PHENOLPHTHALEIN POLYCARBONATES WITH POLYENE RUBBER-MODIFIED MONOVINYLIDENE AROMATIC COPOLYMERS

[75] Inventor: John F. Rudd, Midland, Mich.

[73] Assignee: The Dow Chemical Company, Midland, Mich.

[21] Appl. No.: 48,953

[22] Filed: Jun. 15, 1979

Related U.S. Application Data

[63] Continuation-in-part of Ser. No. 806,990, Jun. 16, 1977, Pat. No. 4,163,762.

[51] Int. Cl.$^3$ .............................................. C08L 67/00
[52] U.S. Cl. .................................................. 525/67
[58] Field of Search ........................................ 525/67

[56] References Cited

U.S. PATENT DOCUMENTS

| | | | |
|---|---|---|---|
| 3,036,037 | 5/1962 | Howe | 260/47 |
| 3,036,038 | 5/1962 | Howe | 260/47 |
| 3,036,039 | 5/1962 | Howe | 260/47 |
| 3,873,641 | 3/1975 | Margotte et al. | 525/152 |
| 3,954,905 | 5/1976 | Margotte et al. | 525/67 |
| 3,988,389 | 10/1976 | Margotte et al. | 525/470 |

FOREIGN PATENT DOCUMENTS 1431194  4/1976  United Kingdom.

Primary Examiner—Carman J. Seccuro

[57] ABSTRACT

Blends of ar,ar'-dihydroxytrityl polycarbonates, such as a copolycarbonate of phenolphthalein and bisphenol-A, with a rubber-modified monovinylidene aromatic copolymer, such as an ABS resin, exhibit improved impact strength, melt flow properties and heat resistance. Such blends are particularly useful in the manufacture of molded parts which must be exposed to high temperatures during manufacture and/or use.

11 Claims, No Drawings

BLENDS OF PHENOLPHTHALEIN POLYCARBONATES WITH POLYENE RUBBER-MODIFIED MONOVINYLIDENE AROMATIC COPOLYMERS

CROSS-REFERENCE TO RELATED APPLICATION

This application is a continuation-in-part of my copending application Ser. No. 806,990, filed June 16, 1977, now U.S. Pat. No. 4,163,762.

BACKGROUND OF THE INVENTION

This invention relates to blends of aromatic polycarbonates with rubber-modified monovinylidene aromatic polymers.

The polycarbonates of dihydric phenols such as bisphenol-A which are described in U.S. Pat. No. 3,028,365 are known to be useful in the manufacture of molded plastic parts. Such resins are notably tough and have moderately high softening temperatures. Unfortunately, however, as a result of their relatively poor melt flow characteristics, such polymers are generally more difficult to mold. Also, such aromatic polycarbonates are relatively expensive materials. Previous attempts to improve the melt flow characteristics of these polycarbonates have generally involved incorporating a lower melting and less expensive polymer into the polycarbonate. See, for example, U.S. Pat. Nos. 3,130,177 and 3,239,582. The blends resulting from such attempts generally exhibit improved melt flow properties at the sacrifice of other desirable features such as heat resistance, impact strength and the like.

In view of the deficiencies of the conventional polycarbonates and blends thereof, it would be highly desirable to provide an economical polycarbonate composition which exhibits improved processibility while retaining or exceeding the desirable properties characteristic of polycarbonates such as impact strength and heat resistance.

SUMMARY OF THE INVENTION

The present invention is such a desirable polycarbonate composition. This composition is a heterogeneous blend comprising at least about 10 and not more than about 90 weight percent of each of the following components: a polycarbonate of an ar,ar'-dihydroxytrityl compound (hereinafter called a trityl diol) blended with a rubber-modified copolymer of a monovinylidene aromatic monomer and an $\alpha,\beta$-ethylenically unsaturated comonomer having a pendant polar group. The rubber-modified copolymer contains a random copolymer of the monovinylidene aromatic monomer and the polar comonomer, a rubber and a graft copolymer comprising the rubber grafted or blocked with a copolymerized mixture of the monovinylidene aromatic monomer and the polar comonomer. The solubility parameter of the random copolymer is within the range from about 9.2 to about 11.2. For the purposes of this invention, solubility parameter of a polymer is defined as the square of the cohesive energy density of the polymer (e.g., as defined by J. H. Hildebrand et al. in *Solubility of Nonelectrolytes*, Third Edition, Reinhold Publishing Corp., pp. 124–129 (1950)).

The polycarbonate blends of this invention are suitably employed in most of the applications in which polycarbonates and rubber-modified polymers have previously been utilized. Applications of particular interest for these polycarbonate blends are housings for electrical appliances, radio and television cabinets, automotive equipment including ornaments and lawn equipment including lawn furniture and the like.

DETAILED DESCRIPTION OF ILLUSTRATIVE EMBODIMENTS

The polycarbonate compositions of the present invention are heterogeneous blends wherein the essential components, i.e., the polycarbonate and rubber-modified copolymer, exist as at least two separate and distinct phases. The proportions of the blend components are not particularly critical and each component can generally vary from about 10 to about 90 weight percent based on the total blend weight. So long as there is sufficient of each component to provide the impact resistance described hereinafter, proportions of the blend components within the aforementioned range of proportions are suitable. Preferably, however, the blend comprises from about 40 to about 90 weight percent of the trityl diol polycarbonate, most preferably from about 50 to about 80 weight percent, and from about 60 to about 10 weight percent of the rubber-modified monovinylidene aromatic copolymer, most preferably from about 50 to about 20 weight percent.

The blends of the present invention are normally solid thermoplastic materials, preferably having melt flow viscosities as determined by ASTM D-1238-65T (Condition I) in the range from about 0.1 to about 5 decigrams per minute (dg/min), more preferably from about 0.3 to about 2 dg/min, most preferably from about 0.5 to about 2 dg/min.

While the blends of this invention, exhibit improved flow properties as might be expected, they exhibit heat and impact resistances which are unusually high in view of the heat and impact resistances of the blend components. Most surprisingly, in some preferred embodiments, the impact resistance of the blend actually exceeds the impact resistance of the polycarbonate component. In other embodiments, the notched Izod impact resistance of injection molded samples of the blend exceeds 4 foot-pounds/inch of notch, and often exceeds 5 foot-pounds/inch of notch as determined by ASTM D-256.

The trityl diol polycarbonates suitably employed in the practice of this invention are polymers of trityl diols including copolymers thereof with other aromatic diols wherein the diols are linked together through carbonate linkages. In this polycarbonate, the proportion of trityl diol is such that the polycarbonate has a Vicat softening temperature of at least 160° C., preferably at least 175° C. Generally, the Vicat softening point of the polycarbonate is no greater than about 270° C., preferably less than about 210° C. Preferably, such proportions of the trityl diol ranges from about 10 to about 100 mole percent, more preferably from about 10 to about 60 mole percent and most preferably from about 20 to about 40 mole percent based on the total diol content of the polycarbonate. While the molecular weight of the polycarbonate is not particularly critical, it is advantageously sufficient to provide the polycarbonate with the desired Vicat softening point. Preferably, the weight average molecular weight of the polycarbonate is from about 15,000 to about 75,000, more preferably from about 20,000 to about 40,000 and most preferably from about 25,000 to about 35,000.

The trityl diols as used herein include those compounds having an ar,ar'-dihydroxytrityl nucleus represented by the formula:

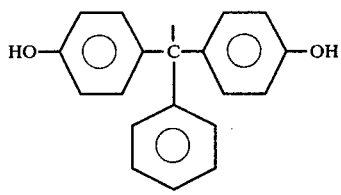

wherein the aromatic ring bear, in addition to the hydroxy substituents, such substituents as H, F, Cl, Br, I, —NO₂, —O—, alkyl, acyl, carboxylate ester, sulfonate ester and the like. Representative trityl diols include phenolphthalein type compounds as described in U.S. Pat. No. 3,036,036; phenolsulfonephthalein compounds as described in U.S. Pat. No. 3,036,037; phthalidene compounds as described in U.S. Pat. No. 3,036,038; fluorescein compounds as described in U.S. Pat. No. 3,036,039; and phenolphthalimidene compounds corresponding to the phenolphthalein compounds described in U.S. Pat. No. 3,036,036; all of which patents are hereby incorporated by reference. Of the foregoing trityl diol compounds, phenolphthalein and substituted phenolphthalein wherein the substituents are chlorine and bromine are preferred, with phenolphthalein being the most preferred. All of the foregoing trityl diols may be prepared by known methods as exemplified in the aforementioned patents.

In addition to the aforementioned trityl diol, the polycarbonate may contain residues of other diols, preferably aromatic diols such as the dihydric phenols represented by the formula:

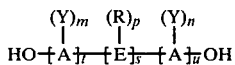

wherein each A is individually an aromatic group such as phenylene, biphenylene, naphthylene, anthrylene and the like; E is alkylene or alkylidene such as methylene, ethylene, ethylidene, propylene, propylidene, isopropylidene, butylene, butylidene, isobutylidene, amylidene or E may be cycloalkylene such as cyclopentylene or cyclohexylene, a sulfur containing linkage such as sulfide, sulfoxide or sulfone, an ether linkage, a carbonyl group, a tertiary nitrogen group, or the like; each R is individually hydrogen or a monovalent hydrocarbon group such as alkyl, aryl, arylalkyl, or cycloaliphatic; each Y is individually chlorine, bromine, fluorine or R wherein R is defined as above; m and n are any whole numbers from and including 0 through the number of positions on A available for substitution; p is any whole number and including 0 through the number of positions available on E; t is any whole number which is 1 or more; s is 0 or 1 and u is any whole number including 0.

Examples of such dihydric phenols include the bis(-hydroxyphenyl) alkylidenes such as 2,2-bis-(4-hydroxyphenyl)propane [bisphenol-A], 2,4'-dihydroxydiphenylmethane, bis-(2-hydroxyphenyl)methane, 1,1-bis(4-hydroxyphenyl)ethane and other bisphenol-A type diols as described in U.S. Pat. No. 3,028,365 as well as the corresponding aromatically substituted or aliphatically substituted dihydric phenols wherein the substituents are halogens such as Cl, F, Br, I, —NO₂, —O—, alkyl, acyl, carboxylate ester, sulfonate ester and the like. Of the foregoing dihydric phenols, bisphenol-A and substituted bisphenol-A are preferred, with bisphenol-A being most preferred.

In the polycarbonate, these diols, other than the trityl diol, constitute the remaining diol proportion of the polycarbonate. Preferably, they constitute from about 0 to about 90 mole percent, more preferably from about 40 to about 90 mole percent, and most preferably from about 20 to about 40 mole percent based on the total diol content of the polycarbonate. For the purposes of this invention, it should be understood that the aforementioned mole percentages of the trityl diol as well as the other diol are based on the total diol residue of the polycarbonate and do not include the linking carbonyl groups.

The trityl diol polycarbonate is readily prepared by phosgenating the trityl diol or a mixture of the trityl diol with the other diol under the conditions described for preparing the trityl diol polycarbonates of U.S. Pat. No. 3,036,036. Alternatively, the trityl diol can be reacted with the bischloroformate derivatives of one or more of the other diols.

The rubber-modified monovinylidene aromatic copolymer utilized in the practice of this invention is a normally solid polymeric material having a rubber polymer portion containing polymerized monomeric rubber precursor such as conjugated diene, a random copolymer portion containing copolymerized monovinylidene aromatic monomer and copolymerized ethylenically unsaturated polar comonomer such as ethylenically unsaturated nitrile, and a graft copolymer portion containing a rubber portion grafted or blocked with a copolymerized mixture of the monovinylidene aromatic monomer and the polar monomer. The relative proportions of the aforementioned rubber, random and graft copolymer portions are not particularly critical. Preferably, however, the weight ratio of total rubber including the rubber portion of the graft copolymer to total copolymerized monovinylidene aromatic/polar monomer including that present in the graft copolymer is from about 50:1 to about 0.01:1, more preferably from about 10:1 to about 0.05:1, and most preferably from about 1:1 to about 0.1:1. The weight ratio of the graft copolymer to the total rubber-modified copolymer is preferably from about 0.98:1 to about 0.01:1, more preferably from about 0.5:1 to about 0.01:1, and most preferably from about 0.15:1 to about 0.03:1. In the graft copolymer, the weight ratio of the rubber to the copolymerized mixture is preferably from about 9:1 to about 0.2:1, more preferably from about 4:1 to about 0.5:1 and most preferably from about 2.5:1 to about 0.8:1. Also in the graft copolymer the ratio of the monovinylidene aromatic monomer to the polar comonomer is generally within the range specified for the random copolymer hereinafter. The molecular weight of the rubber-modified copolymer is not particularly critical so long as its melt flow viscosity is such that it can be melt blended with the aforementioned polycarbonate. Preferably, however, the melt flow viscosity of the rubber-modified copolymer as determined by ASTM D-1238-65T(I) is from about 0.01 to about 10, more preferably from about 0.1 to about 5, and most preferably from about 2 to about 3, deciliters per minute.

The chemical composition of the rubber portion is not particularly critical so long as it can impart the desired elastomeric character to the rubber-modified copolymer and can form a graft or block copolymer containing the random monovinylidene aromatic copolymer. Preferably, the rubber portion is a rubber polymer of a conjugated diene represented by the formula:

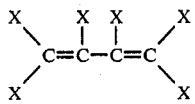

III wherein X is hydrogen, alkyl having from 1 to 5 carbon atoms, chloro and bromo. Examples of suitable dienes include butadiene, isoprene, 1,2-hexadiene, methyl-1,3-pentadiene, 2,3-dimethyl-1,3-butadiene, 1,3-pentadiene, 2-methyl-3-ethyl-1,3-butadiene, 2-ethyl-1,3-pentadiene, 1,3- and 2,4-hexadienes, chloro- and bromo-substituted butadienes such as dichlorobutadiene, bromobutadiene, chloroprene, dibromobutadiene, and mixtures thereof. Of the foregoing dienes, butadiene and isoprene are preferred, with butadiene being especially preferred. Examples of diene rubbers suitably employed in the practice of this invention are homopolymers of butadiene and isoprene, copolymers of butadiene or isoprene and styrene, copolymers of butadiene and acrylonitrile, copolymers of styrene, butadiene and acrylonitrile, and the like.

In the preferred diene rubbers, the amount of diene is sufficient to provide the desired elastomeric character. An especially preferred group of diene rubbers are those containing from about 50 to about 100 weight percent of butadiene and/or isoprene polymerized or copolymerized form and up to about 50 weight percent of monovinylidene aromatic hydrocarbon polymerized or copolymerized form, such as styrene and/or an unsaturated nitrile such as acrylonitrile. Particularly advantageous are the homopolymers of butadiene and copolymers of butadiene with up to 50 weight percent of styrene. These preferred diene rubbers exhibit glass transition temperatures ($T_g$) generally less than 0° C., more preferably less than −30° C. and most preferably from about −110° C. to about −50° C. as determined by ASTM D-746-56T. In the rubber-modified copolymer, the diene rubber advantageously has an average particle size of about 10 micrometers or less, preferably in the range from about 0.2 to about 5 micrometers. Such preferred diene rubbers also exhibit intrinsic viscosities as determined at 25° C. in toluene of from about 0.1 to about 5.

In addition to the aforementioned diene rubber polymers, the rubber portion can be an interpolymer of ethylene, higher α-monoolefins such as propylene and a polyene such as a diene as mentioned hereinbefore or a polyunsaturated bridged ring hydrocarbon such as dicyclopentadiene, bicyclo(2,2,1)hepta-2,5-diene, the alkylidene norbornenes, alkenyl norbornenes as these and other rubber polymers are described in U.S. Pat. No. 3,538,191 which is hereby incorporated by reference in its entirety. For the purpose of this invention, the rubber polymers containing copolymerized polyunsaturated hydrocarbons other than the conjugated dienes shall be called polyene rubbers. Of particular interest are the EPDM rubbers (such as ethylene/propylene/diene rubber polymers) and ethylene/propylene/5-alkylidene-2-norbornene polymers.

In addition to the aforementioned monomeric components, it should be understood that the rubber portion may also contain relatively small amounts, usually less than about 2 weight percent based on the rubber, of a crosslinking agent such as divinylbenzene, diallylmaleate, ethylene glycol dimethacrylate and the like provided that such crosslinking does not eliminate the desired elastomeric character of the rubber.

The random copolymer portion of the rubber-modified copolymer including the graft copolymer is suitably any normally solid random copolymer of at least one monovinylidene aromatic monomer and at least one copolymerizable ethylenically unsaturated monomer having a pendant polar group (a so-called polar comonomer). The type and amount of the polar comonomer in the random copolymer are such that the solubility parameter of the random copolymer is from about 9.2 to about 11.2, preferably from about 9.3 to about 10.8. Preferably the random copolymer contains polymerized therein from about 50 to about 95, most preferably from about 65 to about 85, weight percent of the monovinylidene aromatic monomer, which is preferably styrene, and from about 5 to about 50, most preferably from about 15 to about 35, weight percent of the polar comonomer, which is preferably an α,β-ethylenically unsaturated nitrile, particularly acrylonitrile.

The monovinylidene aromatic monomer is suitably one represented by the formula:

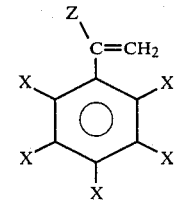

IV wherein X is as defined hereinbefore and Z is hydrogen or methyl. Examples of monovinylidene aromatic compounds include styrene, α-methylstyrene, ar-chlorostyrene, ar-methylstyrene, ar-bromostyrene, ar-(t-butyl)styrene with styrene being preferred.

Suitable polar comonomers include the α,β-ethylenically unsaturated nitriles such as acrylonitrile, methacrylonitrile, fumaronitrile as well as mixtures thereof with other polar comonomers that are copolymerizable with the saturated nitrile or the aromatic monomer. Examples of such other polar comonomers include α,β-ethylenically unsaturated carboxylic acids and their anhydrides and alkyl, aminoalkyl and hydroxyalkyl esters such as acrylic acid, methacrylic acid, itaconic acid, maleic anhydride, ethyl acrylate, butyl acrylate, methyl methacrylate, hydroxyethyl and hydroxypropyl acrylates, aminoethyl acrylate and the like. When the polar comonomer is a mixture of unsaturated nitrile and another polar comonomer, the concentration of the nitrile comonomer in the mixture is such that the random copolymer contains at least 5 weight percent of the nitrile comonomer. Of the foregoing polar comonomers, the ethylenically unsaturated nitriles are preferably employed alone, with acrylonitrile being the most preferred nitrile.

Of the aforementioned rubber-modified graft copolymers, the so-called ABS resins, particularly those that are mixtures of styrene/acrylonitrile copolymer with a graft of the same copolymer on a diene rubber, are especially preferred.

In general, the method employed in preparing the rubber-modified copolymer is not particularly critical since the impact strength of the resultant polycarbonate composition is suitable when any aforementioned rubber-modified copolymer (regardless of method of preparation) is employed therein. However, it is found that the most improvement in impact resistance is obtained when preformed diene rubber is dissolved or dispersed in the monovinylidene aromatic monomer and the polar comonomer and thereafter heated to polymerize the monomers. Polymerization can be effected by heating the solution of rubber and monomer in mass, in emulsion, or while dispersed as droplets in an inert aqueous medium and at temperatures between 50° and 180° C. and pressures ranging from subatmospheric to superatmospheric. Although not required, it is sometimes desirable to employ a polymerization initiator such benzoyl peroxide, di-t-butyl peroxide, dicumyl peroxide, t-butyl hydroperoxide, cumyl hydroperoxide, t-butyl peracetate or other similar free-radical generating peroxygen catalysts. The preferred rubber-modified copolymers are prepared by conventional ABS polymerization methods, e.g., those described in U.S. Pat. Nos. 2,769,804; 3,168,593; 3,243,481; 3,426,103; 3,442,981; 3,499,059 and 3,660,535. Alternatively, rubber-modified copolymers, which contain polyene rubber polymers, can be prepared by the method described in U.S. Pat. No. 3,538,191.

In addition to the aforementioned polycarbonate and rubber-modified copolymer, it is sometimes desirable to include a random block or graft copolymer of a monovinylidene aromatic monomer and a polar comonomer, other than the polar comonomer of the aforementioned random copolymer, as a third component in the blend. This third component copolymer may also be modified with a rubber as defined hereinbefore. This other or third component copolymer is normally employed in concentrations from about 1 to about 25, preferably from about 5 to about 20, weight percent based on the total blend. This third component copolymer preferably has a solubility parameter from about 9.8 to about 10.8.

Exemplary third component copolymers include copolymers of monovinylidene aromatic monomers as defined hereinbefore, preferably styrene, and polar monomers other than the aforementioned nitriles, preferably the α,β-ethylenically unsaturated carboxylic acids or anhydrides, most preferably maleic anhydride. In the third component copolymer, the monovinylidene aromatic monomer constitutes from about 50 to about 95, preferably from about 67 to about 90, weight percent and the polar comonomer constitutes from about 50 to about 5, preferably from about 33 to about 10, weight percent. In addition, this third component advantageously contains up to about 40, preferably from about 5 to about 40, weight percent of a rubber, preferably a diene rubber as defined hereinbefore.

In the preparation of the polycarbonate blend of the present invention, the polymeric components are combined by conventional mixing techniques such as admixing of granular or particulate polymeric components and subsequent malaxation of components at temperatures sufficient to cause heat plastification thereof. Alternatively, the blends may be prepared by heat plastifying the higher melting polymeric components and adding the other components thereto either in granular or heat plastified form. When a third component monovinylidene aromatic copolymer such as a styrene/maleic anhydric copolymer is to be employed, it is generally desirable to combine the rubber-modified copolymer and the third component copolymer into a uniform mixture prior to combining with the polycarbonate.

One particularly convenient method for preparing the polycarbonate blend in accordance with the present invention is to dry blend a particulate of the polycarbonate with a particulate of the rubber-modified copolymer or a mixture thereof with the third component copolymer and directly feed this dry blend into a heat fabricating apparatus such as a screw extruder or a reciprocating screw injection molding machine. The particular manner of mixing these components in heat plastified form is not critical but sufficient working should be employed to insure a uniform distribution of each of the components throughout the resulting polycarbonate composition. In addition to the foregoing mixing procedures, other conventional mixing procedures may be employed including hot roll milling, kneading and the like.

The following examples are given to illustrate the invention but should not be construed as limiting its scope. Unless otherwise indicated, all parts and percentages are by weight.

EXAMPLE 1

A 500-g portion of granular bisphenol-A/phenolphthalein copolycarbonate having a weight average molecular weight (Mw) of 26,000 and containing the monomeric species in a 3:1 weight ratio wherein the granules have a major dimension of ~⅛" is dry blended with a 500-g portion of ABS resin granules (major dimensions of ~⅛") by tumbling for one-half hour. The ABS resin contains a graft copolymer having a butadiene rubber backbone and graft portion of random styrene/acrylonitrile copolymer, an ungrafted butadiene rubber and a random styrene/acrylonitrile copolymer. The rubber particles in the ABS resin have diameters in the range of 0.5–2 micrometers. The random copolymer in the ABS resin contains 73 weight percent copolymerized styrene and 27 weight percent copolymerized acrylonitrile and has a solubility parameter of 9.8. The ABS resin is prepared by mass polymerizing 64 weight parts of styrene and 25 weight parts of acrylonitrile in the presence of about 11 weight parts of butadiene rubber.

The resulting dry blended granules of polycarbonate and ABS resin are charged to a 0.8" twin-screw mixing extruder (Welding Engineers) having a barrel temperature (feed to die) profile of 475° F., 500° F., 550° F., 550° F., 525° F. and 500° F. The dry blend is thereby heat plastified, extruded, granulated and molded into bars for testing for impact resistance and heat resistance as reported in Table I. Residence time of the blended material in the extruder is ~90 seconds and the extruder is operated at 190–250 rpm.

For the purpose of comparison, several other phenolphthalein copolycarbonates and ABS resins are combined at different portions to form blends (Sample Nos. 2–14) and are tested for impact and heat resistance. The results of these tests are also reported in Table I.

As an illustration of the unusual character of the blends of the present invention, two blends (Sample Nos. A$_1$–A$_2$) are prepared using a bisphenol-A homopolymer having a weight average molecular weight of 30,000 (sold under the trademark LEXAN ® 101 by General Electric) and various of the aforementioned ABS resins are similarly prepared and tested for impact and heat resistance. The results of these tests are similarly recorded in Table I. As points of reference, the impact and heat resistance of the various individual components (Sample Nos. C₁–C₈) employed in the aforementioned blends are also reported in Table I.

These blends (Sample Nos. A₁–A₂) are also tested and the results are reported in Table II.

TABLE II

| Sample No. | Polycarbonate (1) Type | Amount, wt % | Rubber-Modified Copolymer (2) Type | Amount, wt % | Vicat Softening Point (4) °C. | Notched Izod (5) ft-lbs/in-notch |
|---|---|---|---|---|---|---|
| 1 | BPA/PP(a) | 50 | ATS | 50 | 152 | 13.54 |
| A₁* | BPA(c) | 50 | " | 50 | 131 | 10.96 |
| 2 | BPA/PP(a) | 75 | " | 25 | 165 | 17.67 |
| A₂* | BPA(c) | 75 | " | 25 | 149 | 10.60 |
| C* |  | 0 | " | 100 | 104 | 1.25 |

*Not an example of the invention
(1) Same as (1) of Table I
(2) ATS - rubber-modified styrene/acrylonitrile copolymer consisting essentially of (1) 65.5% copolymerized styrene, (2) 22% copolymerized acrylonitrile and (3) 12.5% ethylene/propylene/5-ethylidene-2-norbornene terpolymer rubber (grafted and nongrafted) containing 8

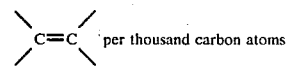 per thousand carbon atoms (sold by Copolymer Rubber and Chemical Corporation under the trade name Epsyn 55).
(4) Same as (4) of Table I
(5) Same as (5) of Table I

TABLE I

| Sample No. | Polycarbonate⁽¹⁾ Type | Amount, wt % | Rubber-Modified Copolymer⁽²⁾ Type | Amount, wt % | Third Component Copolymer⁽³⁾ Type | Amount, wt % | Vicat Softening Point⁽⁴⁾ °C. | Notched Izod⁽⁵⁾ ft-lbs/in-notch |
|---|---|---|---|---|---|---|---|---|
| 1 | BPA/PP(a) | 40 | ABS(f) | 60 |  |  | 128 | 11.6 |
| 2 | " | 50 | " | 50 |  |  | 143 | 15.9 |
| 3 | " | 60 | " | 40 |  |  | 152 | 13.5 |
| 4 | " | 40 | ABS(g) | 60 |  |  | 123 | 9.5 |
| 5 | " | 50 | " | 50 |  |  | 136 | 13.9 |
| 6 | " | 60 | " | 40 |  |  | 147 | 15.2 |
| 7 | " | 70 | " | 30 |  |  | 152 | 18.4 |
| 8 | BPA/PP(b) | 40 | ABS(g) | 60 |  |  | 129 | 5.3 |
| 9 | " | 50 | " | 50 |  |  | 136 | 13.0 |
| 10 | " | 60 | " | 40 |  |  | 157 | 13.0 |
| 11 | " | 70 | " | 30 |  |  | 175 | 12.5 |
| 12 | BPA/PP(a) | 50 | ABS(h) | 50 |  |  | 134 | 13.1 |
| 13 | " | 50 | ABS(i) | 50 |  |  | 138 | 14.2 |
| 14 | " | 50 | ABS(g) | 33 | SMA(j) | 17 | 145 | 20.8 |
| A₁* | BPA(c) | 50 | ABS(f) | 50 |  |  | 120 | 15.2 |
| A₂* | " | 50 | ABS(g) | 50 |  |  | 132 | 10.2 |
| C₁* | " | 100 |  |  |  |  | 154 | 16.5 |
| C₂* | BPA/PP(a) | 100 |  |  |  |  | 182 | 10.0 |
| C₃* | BPA/PP(b) | 100 |  |  |  |  | 210 | 2.5 |
| C₄* |  |  | ABS(f) | 100 |  |  | 102 | 4.0 |
| C₅* |  |  | ABS(g) | 100 |  |  | 104 | 5.5 |
| C₆* |  |  | ABS(h) | 100 |  |  | 103 | 4.0 |
| C₇* |  |  | ABS(i) | 100 |  |  | 103 | 8.1 |
| C₈* |  |  |  |  | SMA(j) | 100 | 149 | 2.8 |

*Not an example of the invention
⁽¹⁾BPA/PP(a) - 75/25 (pbw) bisphenol A/phenolphthalein copolycarbonate having a molecular weight ($M_w$) of 29,400.
BPA/PP(b) - 50/50 (pbw) bisphenol A/phenolphthalein copolycarbonate having a molecular weight ($M_w$) of 31,000.
BPA(c) - commercial bisphenol A polycarbonate sold under the tradename LEXAN® 101-111 by General Electric.
⁽²⁾ABS(f) - commercial medium impact ABS as described hereinbefore in this Example.
ABS(g) - similar to ABS(f) except that the rubber content is approximately twice the rubber content of ABS(f).
ABS(h) - commercial medium impact ABS sold under tradename LUSTRAN²⁰⁰ 440 by Monsanto.
ABS(i) - commercial high impact ABS sold under tradename LUSTRAN® 780 by Monsanto.
⁽³⁾SMA(j) - a rubber modified styrene/maleic anhydride copolymer as described in U.S. Pat. No. 3,966,842.
⁽⁴⁾ASTM D-1525
⁽⁵⁾ASTM D-256. Injection Molded Samples

EXAMPLE 2

Following the procedure of Example 1, two blends are prepared of bisphenol-A/phenolphthalein copolycarbonate (BPA/PP(a)) and a rubber-modified copolymer as specified in Table II. The blends (Sample Nos. 1 and 2) are tested for Vicat Softening Point and Notch Izod and the results are reported in Table II.

For purposes of comparison, similar blends are prepared of the aforementioned rubber-modified copolymer and a bisphenol-A homopolycarbonate (BPA(c)).

What is claimed is:

1. A heterogeneous blend comprising at least about 10 and not more than about 90 weight percent of the following components: (1) a polycarbonate of an ar,ar'-dihydroxytrityl compound and (2) a rubber-modified copolymer of a monovinylidene aromatic monomer and an α,β-ethylenically unsaturated comonomer having a pendant polar group, said rubber-modified copolymer containing (a) an interpolymer of ethylene-higher α-monoolefin polyene rubber, (b) a random copolymer of the monovinylidene aromatic monomer and the polar comonomer and (c) a graft copolymer containing the rubber grafted or blocked with a copolymerized mixture of the monovinylidene aromatic monomer and the polar comonomer, said random copolymer having a solubility parameter within the range from about 9.2 to about 11.2.

2. The blend of claim 1 comprising (1) from about 40 to about 90 weight percent of the polycarbonate wherein the polycarbonate has a Vicat softening point above 160° C. and (2) from about 60 to about 10 weight percent of the rubber-modified copolymer which comprises (a) a polyene rubber, (b) a random copolymer of a monovinylidene aromatic monomer and an $\alpha,\beta$-ethylenically unsaturated nitrile, said random copolymer having a solubility parameter in the range from about 9.3 to about 10.8, and (c) a graft copolymer containing the polyene rubber grafted or blocked with a copolymerized mixture of the monovinylidene aromatic monomer and the $\alpha,\beta$-ethylenically unsaturated nitrile, the weight ratio of the total polyene rubber including that of the graft copolymer to the total copolymerized monovinylidene aromatic monomer and unsaturated nitrile in the random copolymer and the graft copolymer being from about 50:1 to about 0.01:1 and the weight ratio of the graft copolymer to total rubber-modified copolymer is from about 0.98:1 to about 0.01:1.

3. The blend of claim 2 wherein the polycarbonate is a copolycarbonate of from about 10 to about 60 mole percent of phenolphthalein and from about 90 to about 40 mole percent of another dihydric phenol, said mole percentages based on the total diol content of the copolycarbonate.

4. The blend of claim 3 wherein the other dihydric phenol is a bis(hydroxyphenyl)alkylidene.

5. The blend of claim 4 comprising (1) a copolycarbonate of phenolphthalein and 2,2-bis-(4-hydroxyphenyl)propane and (2) a rubber-modified copolymer which comprises (a) a polyene rubber containing ethylene and propylene copolymerized therein in molar ratios from about 80:20 to about 20:80 and sufficient copolymerized polyunsaturated bridged ring hydrocarbon to provide an unsaturation level of at least 2 carbon-to-carbon double bonds per thousand carbon atoms in the rubber, (b) a random copolymer containing copolymerized therein from about 50 to about 95 weight percent of styrene and from about 50 to about 5 weight percent of acrylonitrile and (c) a graft copolymer containing the rubber grafted with a copolymerized mixture of the styrene and the acrylonitrile wherein the weight ratio of the rubber being grafted to the copolymerized mixture is from about 9:1 to about 0.2:1 and the ratio of styrene to acrylonitrile in the copolymerized mixture is from about 1:1 to about 19:1.

6. The blend of claim 5 wherein the polyene rubber contains ethylene and propylene copolymerized therein in a molar ratio of ethylene to propylene in the range from about 70:30 to about 55:45 and sufficient copolymerized 5-ethylidene-2-norbornene to provide an unsaturated level in the range from about 3 to about 16 carbon-to-carbon double bonds per thousand carbon atoms in the rubber.

7. The blend of claim 5 wherein the notched Izod impact resistance of the blend as determined by ASTM D-256 on an injection molded sample is greater than the corresponding impact resistance of the copolycarbonate.

8. The blend of claim 5 wherein the notched Izod impact resistance of the blend as determined by ASTM D-256 on an injection molded sample is greater than 5 foot-pound/inch of notch.

9. The blend of claim 1 which contains from about 1 to about 25 weight percent based on the blend of a third component copolymer of a monovinylidene aromatic monomer and a polar comonomer other than the polar comonomer of the random copolymer.

10. The blend of claim 5 which contains from about 5 to about 20 weight percent based on the blend of a third component copolymer containing copolymerized therein from about 67 to about 90 weight percent of styrene and from about 33 to about 10 weight percent of maleic anhydride and up to 40 weight percent of a diene rubber.

11. The blend of claim 5 which also contains a diene rubber in addition to the polyene rubber.

* * * * *